United States Patent
Zalewski et al.

(10) Patent No.: US 10,195,528 B2
(45) Date of Patent: Feb. 5, 2019

(54) SYSTEMS FOR USING THREE-DIMENSIONAL OBJECT AS CONTROLLER IN AN INTERACTIVE GAME

(71) Applicant: Sony Interactive Entertainment America LLC, San Mateo, CA (US)

(72) Inventors: Gary Zalewski, Oakland, CA (US); Tomas Gillo, London (GB)

(73) Assignee: Sony Interactive Entertainment America LLC, San Mateo, CA (US)

( * ) Notice: Subject to any disclaimer, the term of this patent is extended or adjusted under 35 U.S.C. 154(b) by 236 days.

(21) Appl. No.: 15/366,980

(22) Filed: Dec. 1, 2016

(65) Prior Publication Data
US 2017/0080338 A1    Mar. 23, 2017

Related U.S. Application Data

(60) Continuation of application No. 14/822,829, filed on Aug. 10, 2015, now Pat. No. 9,511,282, which is a
(Continued)

(51) Int. Cl.
| | |
|---|---|
| *A63F 13/213* | (2014.01) |
| *A63F 13/42* | (2014.01) |
| *G06F 3/0481* | (2013.01) |
| *G06F 3/03* | (2006.01) |
| *A63F 13/812* | (2014.01) |
| *A63F 13/40* | (2014.01) |

(Continued)

(52) U.S. Cl.
CPC .............. *A63F 13/42* (2014.09); *A63F 13/10* (2013.01); *A63F 13/213* (2014.09); *A63F 13/45* (2014.09); *A63F 13/812* (2014.09); *G06F 3/017* (2013.01); *G06F 3/0304* (2013.01); *G06F 3/0346* (2013.01); *G06F 3/04815* (2013.01); *A63F 2300/1093* (2013.01); *A63F 2300/6045* (2013.01); *A63F 2300/8011* (2013.01); *G06T 7/20* (2013.01); *G06T 7/60* (2013.01); *G06T 7/70* (2017.01); *G06T 19/006* (2013.01)

(58) Field of Classification Search
CPC ........ A63F 13/42; A63F 13/213; A63F 13/45; A63F 13/812; A63F 13/10; A63F 2300/1093; A63F 2300/6045; A63F 2300/8011; G06F 3/017; G06F 3/0304; G06F 3/0346; G06F 3/04815
USPC .......................................................... 463/33
See application file for complete search history.

(56) References Cited

U.S. PATENT DOCUMENTS

| | | | | |
|---|---|---|---|---|
| 2002/0149583 A1* | 10/2002 | Segawa | ................... | G06F 3/011 345/420 |
| 2006/0082546 A1* | 4/2006 | Wey | ...................... | G06F 3/0346 345/156 |

* cited by examiner

*Primary Examiner* — Allen Chan
(74) *Attorney, Agent, or Firm* — Martine Penilla Group, LLP

(57) ABSTRACT

Systems and method are provided for executing an application for interfacing with a virtual reality scene. In one method includes capturing image data of an object using a camera and processing the image data of the object to identify geometric parameters of object. During an interactive session processed by a computer system, the method uses the captured image data and the identified geometric parameters of the object to track movements of the object. The method then causes rendering on a display, the virtual object. The virtual object is used to represent the object. The virtual object rendered on the display such that movement of the object causes rendering of corresponding movement by the virtual object on the display screen.

20 Claims, 14 Drawing Sheets

Related U.S. Application Data continuation of application No. 13/933,388, filed on Jul. 2, 2013, now Pat. No. 9,101,829, which is a division of application No. 12/335,505, filed on Dec. 15, 2008, now Pat. No. 8,542,907.

(60) Provisional application No. 61/014,427, filed on Dec. 17, 2007.

(51) Int. Cl.
*G06F 3/0346* (2013.01)
*A63F 13/45* (2014.01)
*G06F 3/01* (2006.01)
*G06T 7/70* (2017.01)
*G06T 7/20* (2017.01)
*G06T 7/60* (2017.01)
*G06T 19/00* (2011.01)

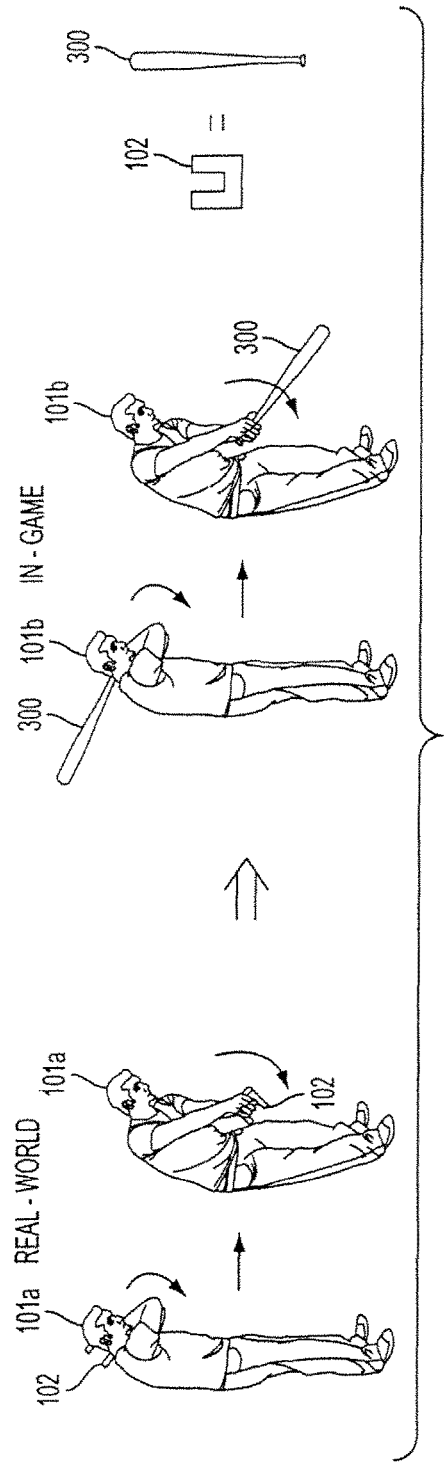
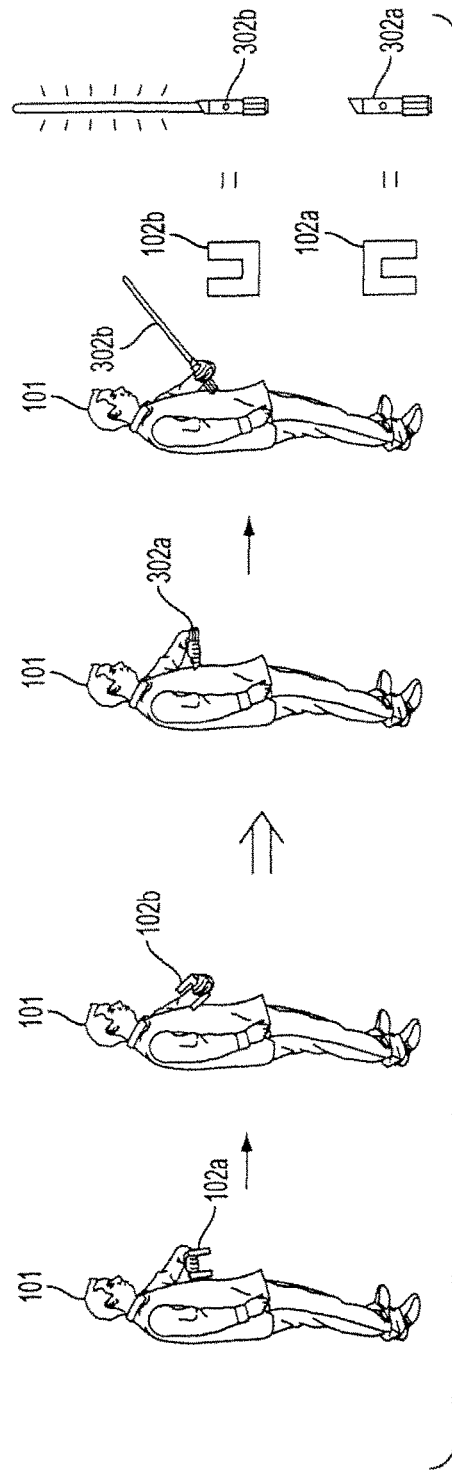
FIG. 3A
FIG. 3B

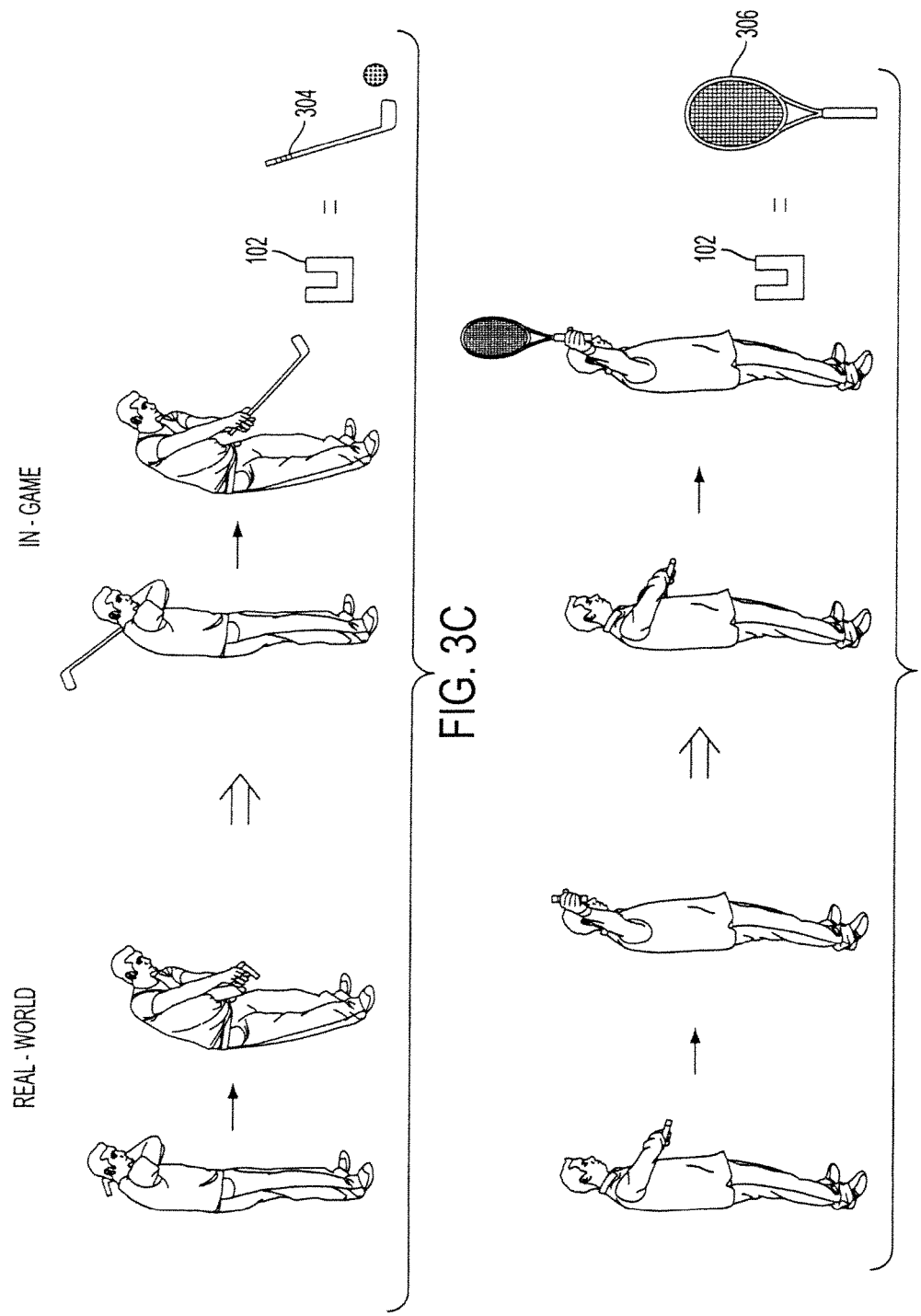

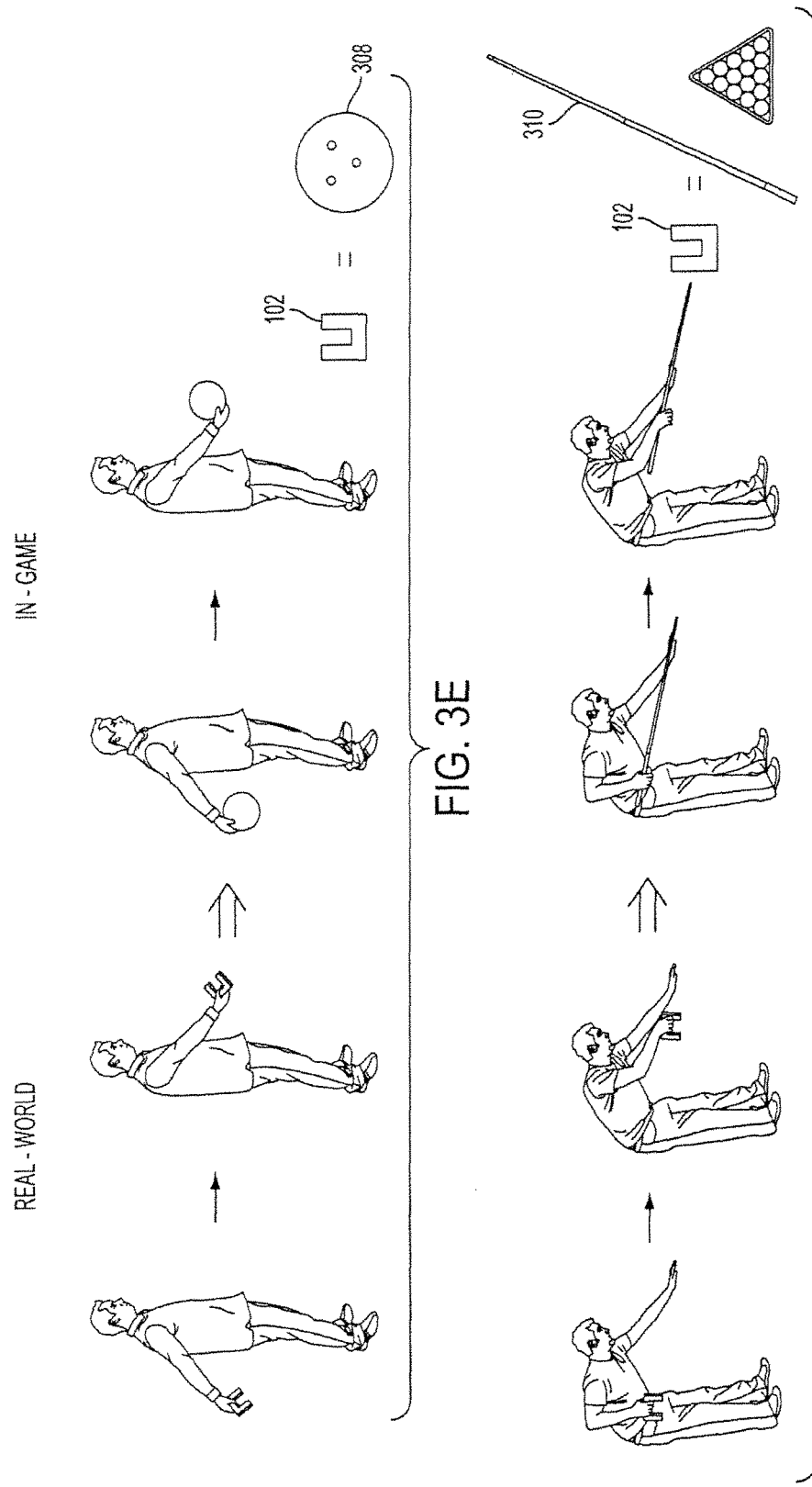

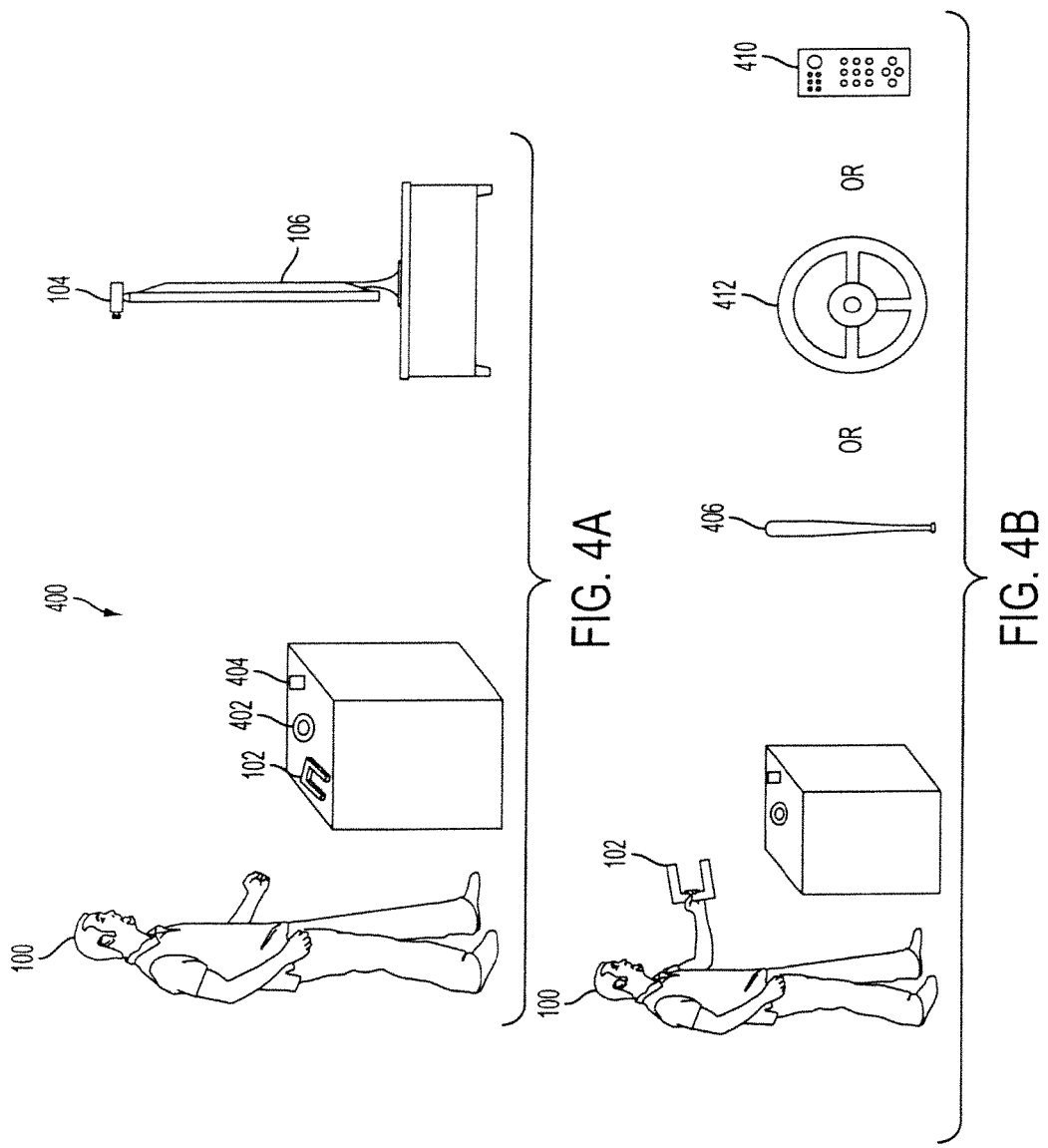

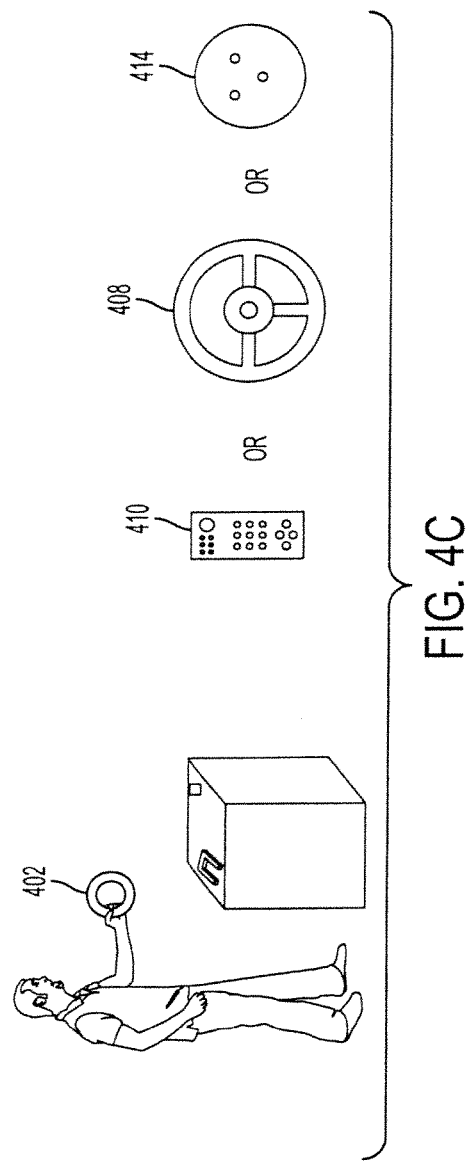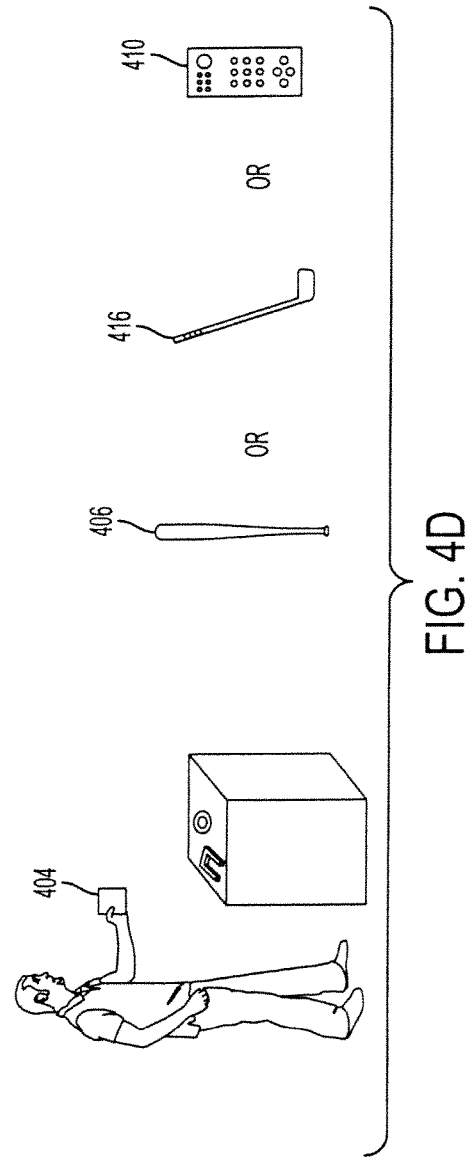

SYSTEMS FOR USING THREE-DIMENSIONAL OBJECT AS CONTROLLER IN AN INTERACTIVE GAME

CLAIM OF PRIORITY

This application is a continuation of U.S. application Ser. No. 14/822,829, filed on Aug. 10, 2015, which is a continuation of U.S. application Ser. No. 13/933,388, filed on Jul. 2, 2013, now issued U.S. Pat. No. 9,101,829, which is a divisional of U.S. patent application Ser. No. 12/335,505, filed on Dec. 15, 2008, now issued as U.S. Pat. No. 8,542,907, which claims priority from U.S. Provisional Application No. 61/014,427, entitled "DYNAMIC THREE-DIMENSIONAL OBJECT MAPPING FOR USER-DEFINED CONTROL DEVICE", filed on Dec. 17, 2007, which are herein incorporated by reference.

BACKGROUND OF THE INVENTION

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation, Sony Playstation2 (PS2), and Sony Playstation3 (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers have continued to innovate to enable additional interactivity and computer programs. The traditional way of interacting with a computer program or interactive game has remained relatively unchanged, even thought there have been great advances in processing power. For example, computer systems still require basic input objects, such a computer mouse, a keyboard, and possibly other specially manufactured objects/devices. In a similar manner, computer gaming consoles generally require some type of controller, to enable interaction with a game and/or console. All of these input objects, however, are specially manufactured with a predefined purpose and have special buttons, configurations and functionality that is predefined. Accordingly, traditional interfacing devices must be purchased, and used for the purpose defined by the manufacturer.

It is within this context that embodiments of the invention arise.

SUMMARY

In one embodiment, a computer-implemented method to interactively capture and utilize a three-dimensional object as a controlling device for a computer system is disclosed. One operation of the method is capturing depth data of the three-dimensional object. In another operation, the depth data of the three-dimensional object undergoes processing to create geometric defining parameters for the three-dimensional object. The method can also include defining correlations between particular actions performed with the three-dimensional object and particular actions to be performed by the computer system. The method also includes an operation to save the geometric defining parameters of the three-dimensional object to a recognized object database. In another operation, the correlations between particular actions performed with the three-dimensional object and particular actions to be performed by the computer system in response to recognizing the particular actions are also saved to the recognized object database.

In one embodiment, a method is provided that includes capturing image data of an object using a camera and processing the image data of the object to identify geometric parameters of object. During an interactive session processed by a computer system, the method uses the captured image data and the identified geometric parameters of the object to track movements of the object. The method then causes rendering on a display, the virtual object. The virtual object is used to represent the object. The virtual object rendered on the display such that movement of the object causes rendering of corresponding movement by the virtual object on the display screen.

In one embodiment, a system for initiating and using a three-dimensional object as a controlling device when interfacing with a computer system used for interactive video game play, is provided. The system includes an interface for receiving data from a capturing device of a three-dimensional space and storage coupled with computer system. The computer system provides data to a screen and receiving user input to obtain geometric parameters of the three-dimensional object and assign actions to be performed with the three-dimensional object when moved or placed in positions in front of the capture device during interactive video game play. The geometric parameters and the assigned actions being saved to a database on the storage for access during interactive video game play or future interactive sessions.

In another embodiment, a computer-implemented method is disclosed to interactively capture and utilize a three-dimensional object to be a controlling device for a computer system. The method includes an operation for identifying the three-dimensional object. To identify the three-dimensional object, there are operations for capturing depth data of the three-dimensional object and processing captured depth data of the three-dimensional object to create geometric defining parameters for the three-dimensional object. There are also operations for defining correlations between particular actions performed with the three-dimensional object and particular actions to be performed by the computer system. Additionally, there are also operations for saving the geometric defining parameters of the three-dimensional object and correlations between particular actions performed with the three-dimensional object and particular actions to be performed by the computer system to a recognized object database. The method also includes operations for presenting the three-dimensional object to a camera and moving the presented three-dimensional object in front of the camera so as to trigger one or more of the particular actions to be performed by the computer system.

In yet another embodiment, a system for using a three-dimensional object as a controlling device when interfacing with a computer system is disclosed. The system includes a camera interfaced with the computer system that is configured to capture data from a three-dimensional space. Also include in the system is storage that is linked to the computer system. The system can also include a display that can be coupled to the computer system. The display can be configured to display a plurality of graphical display screens to enable set-up of a capture session to obtain geometric parameters of an object. The capture session can also be used to assign actions to be performed with the object when moved in front of the camera during an interactive session. During the interactive session, the geometric parameters and the assigned actions can be saved to a database for access on the storage linked to the computer system. Wherein the assigned actions can be custom defined by a user for particular movements made by the user on the object when holding the object in front of the camera.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIGS. 3A-3G illustrate real-world and virtual-world views of various actions performed by users while holding the three-dimensional object 102, in accordance with various embodiments of the present invention.

FIGS. 4A-4D are examples where various three-dimensional objects can be recognized and used to control a variety of virtual devices based on the configuration of the three-dimensional object and the software being executed by the computer system, in accordance with one embodiment of the present invention.

DETAILED DESCRIPTION

Figure 1:
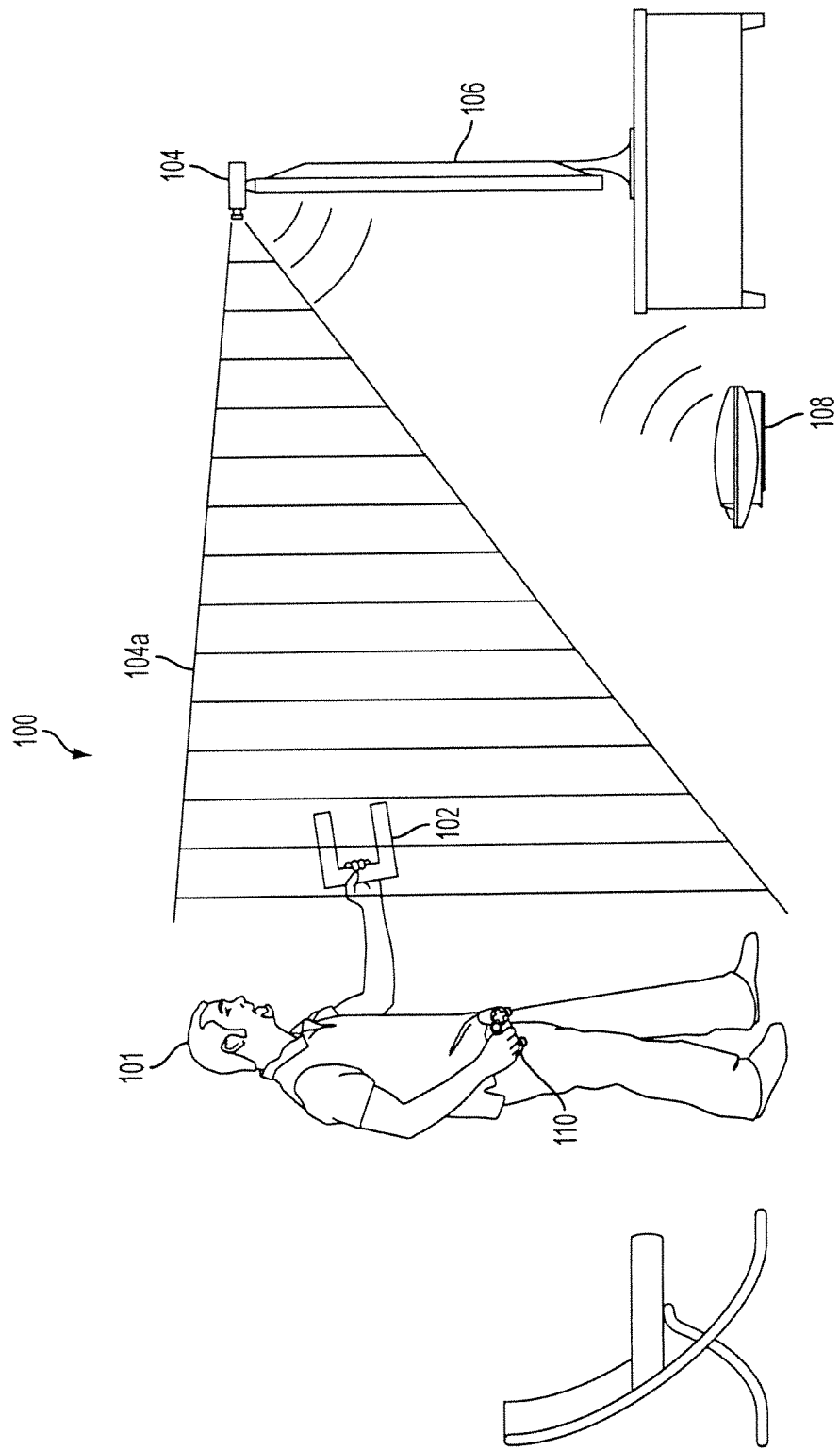
FIG. 1 illustrates a scene 100 with a user 101 manipulating a generic three-dimensional object 102 to interact with a computer system 108 in accordance with one embodiment of the present invention.

An invention is disclosed for capturing geometric identifying data for everyday objects and mapping controls to the everyday object to control a computer system. Broadly speaking, the computer system can be any type of system that takes input from a user, whether it be a general purpose computer (e.g., desktop, laptop, portable device, phone, etc.), or a special purpose computer like a game console. A camera capable of measuring depth data can be used to capture geometric data along with actions that can be correlated to controls for a variety of different programs. In one embodiment, a single camera is used, and in other embodiments, multiple cameras can be used to capture images from various locations or view perspectives. The correlated controls can be used to control aspects of a virtual object defined by a program executed by the computer system. The correlations between actions performed with the object and control of the virtual world element can be saved with the captured geometric identifying data of the object. Comparisons of real-time image data captured by the camera can be made to geometric identifying data that has been saved in order to recognize an object that is presented to the camera. Once recognized, the saved correlations can be loaded and the user can manipulate the object to control various aspects of a virtual object. Accordingly, the capturing sequences, methods and systems should be broadly understood to enable the capture of any real-world object, discern its geometric identifying data and enable mapping of various controls to the real-world object. Recognition of the object along with recognition of actions correlated to control of a program can improve user interaction with the computer system.

As used herein, a three-dimensional object should include any physical or material thing that can be touched, held, moved, captured in an image, captured in a video, compared to other things to discern its size or relative size, or identified based on height, width, length, or depth, and the like. A virtual-world object shall be broadly construed to include a computer generated image or images that can be displayed on a screen. The screen can represent the virtual-world object as a two or three dimensional thing and can be animated to move, be placed, be interacted with, or be modified based on user interactivity. The interactivity can include commands provided by the user, using a three-dimensional object or other interface devices such as keyboards, computer mice, touch screens, gaming controllers, motion sensors, or, acoustic or audible sounds and combinations thereof. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

FIG. 1 illustrates a scene 100 with a user 101 manipulating a generic three-dimensional object 102 to interact with a computer system 108 in accordance with one embodiment of the present invention. The computer system 108 can output video to a display 106. In some embodiments the display 106 can be a computer monitor while in other embodiments the display 106 can be a television. While not shown in the scene 100, the computer system 108 can also output audio. Associated with the computer system 108 is a camera 104. The camera 104 can capture images and video that can be processed by the computer system 108. The computer system 108 is shown wirelessly communicating with the camera 104, but wired connections can also be used.

The camera 104 can be configured to capture depth data, as shown by depth sensing lines 104*a*. In some embodiments, the depth data from the camera 104 is transmitted to and processed by the computer system 108. User input from a controller 110 is also transmitted to the computer system 108. In various embodiments, the controller 110 transmits user input using wireless protocols such as, but not limited to, Bluetooth or WiFi. Thus, a controller with a wired connection to the computer system 108 can also be used. As will be discussed in greater detail below, a generic three-dimensional object 102, recognized by the computer system 108 via images captured from the camera 104 can also be used to provide user input to the computer system 108. The "U" shape of the three-dimensional object 102 should not be construed to be limiting, as the shape was chosen for illustrative clarity and simplicity. The term "three-dimensional object" is intended to describe any physical object capable of being held by a user. As such, the three-dimensional object 102 does not need to be specifically made to interface with the computer system 108, but may have been a random object found in the home of user 101.

Figure 2A:
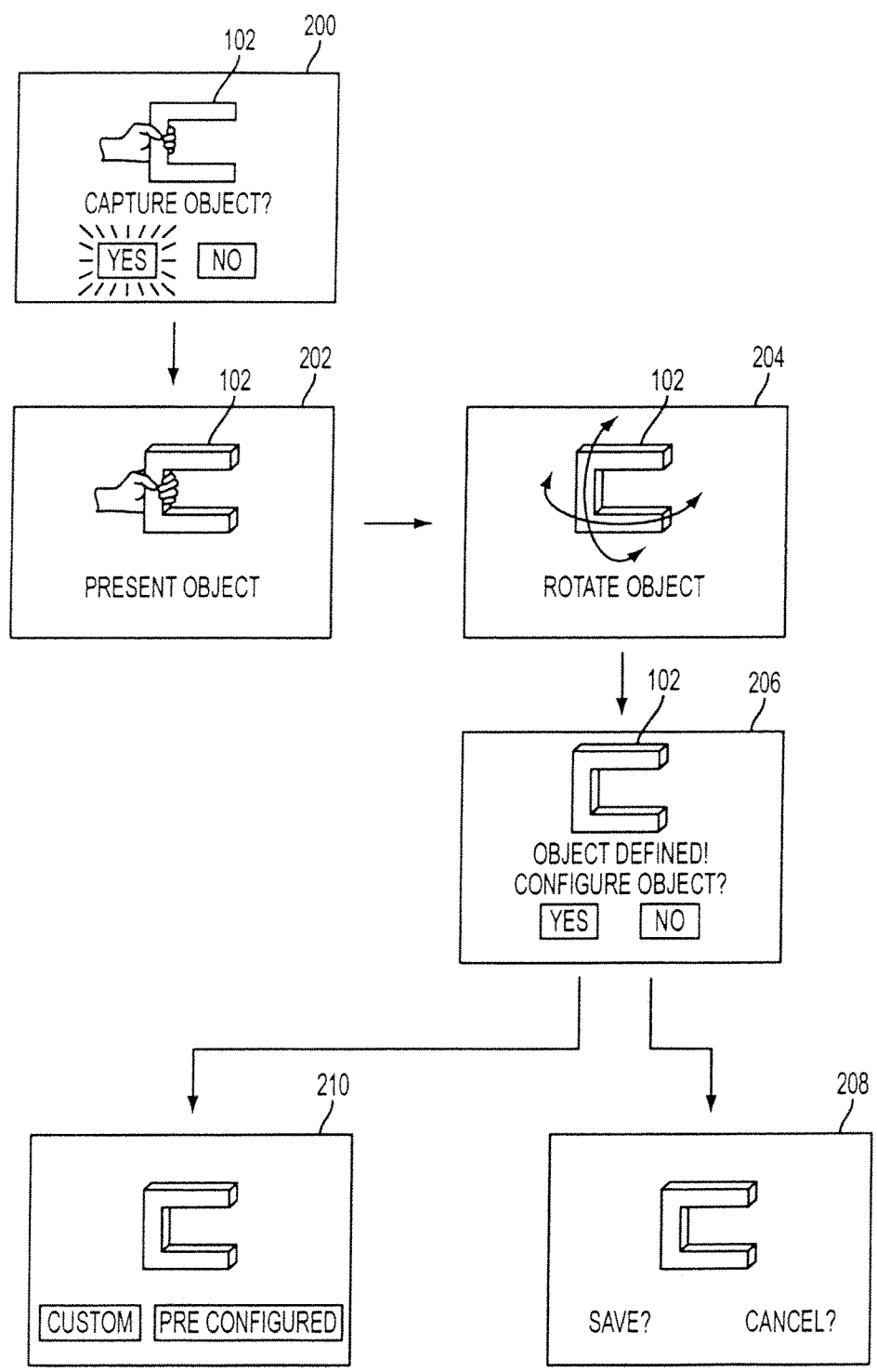
FIG. 2A is an exemplary flow chart illustrating various operation that can be performed to allow the computer system 108 to recognize the three-dimensional object 102, in accordance with one embodiment of the present invention.

FIG. 2A is an exemplary flow chart illustrating various operations that can be performed to allow the computer system 108 to recognize the three-dimensional object 102, in accordance with one embodiment of the present invention. The flow chart is shown with exemplary images displayed to the user from the user's perspective. Operation 200 shows a user manipulating an exemplary graphical user interface to initiate an object capture procedure. A variety of user interfaces including various menus can be used to display and interact with the computer system. In other embodiments, audible commands, gestures, or user input into a controller or previously captured three-dimensional object can be recognized to initiate the capture process shown in operation 200.

In operation 202, the user presents the three-dimensional object 102 to the camera. For simplicity, the three-dimensional object 102 is shown as a blocky "U" shaped object. However, the three-dimensional object 102 can be any real-world object that can be manipulated by a person and perceived by the camera. Exemplary three-dimensional objects include items such as coffee mugs, drinking glasses, books, bottles, etc. Note that the previously discussed three-dimensional objects were intended to be exemplary and should not be construed as limiting.

In operation 204, the user is prompted to rotate the three-dimensional object 102 in front of the camera. As shown in FIG. 2, the user can be prompted to rotate the three-dimensional object 102 is different directions to allow the camera can capture views necessary to recognize the three-dimensional object 102. When the user rotates the three-dimensional object 102, the camera and computer system can capture and process geometric defining parameters associated with the three-dimensional object 102. In another embodiment, more than a single camera can be used, when placed in various locations to allow image mapping from various angles of the space. In one embodiment, the computer system uses depth data from the camera to measure ratios between various geometric defining parameters on the three-dimensional object. Geometric defining parameters can include, but are not restricted to recognizable features of a three-dimensional object such as points, planes, transitional surfaces, fillets, accent lines, and the like. In such an embodiment, recognizing ratios between geometric defining parameters can allow the computer system to more readily recognize the three-dimensional object if the three-dimensional object is presented to the camera for recognition at a different distance than when it was captured. Operation 206 informs the user when sufficient views of the three-dimensional object 102 have been presented so the computer system can recognize the three-dimensional object 102 based on the defined geometric parameters.

In one embodiment, operation 206 displays a computer-generated model of the three-dimensional object 102, as captured and modeled by the computer system. In another embodiment, operation 206 displays real-time video of the user holding the three-dimensional object 102. Operation 206 allows a user to choose between saving the three-dimensional object 206 without configuration, or continue to configure the three-dimensional object 206.

Continuing with FIG. 2A, Operation 208 is an exemplary view of a screen prompting the user to save the geometric parameters associated with the three-dimensional object 102. Operation 208 is an exemplary screen where users can choose to save the geometric parameters of the three-dimensional object 102 or to cancel the save procedure. If a user chooses to configure the three-dimensional object, operation 210 allows a user to choose between pre-configured or custom configurations. In either case, configuring the three-dimensional object 102 allows a user to define correlations between particular actions performed with the three-dimensional object 102 and particular actions to be performed by the computer system. In one embodiment, the user can select a pre-configured setting that enables control the computer system user interface with user-performed actions with the three-dimensional object 102. For example, the pre-configured setting can correlate user-performed actions with the three-dimensional object to navigation and selection of menus within a graphical user interface. In other embodiments, the user can custom configure the three-dimensional object to control aspects of a game being executed by the computer system, as will be discussed below.

Figure 2B:
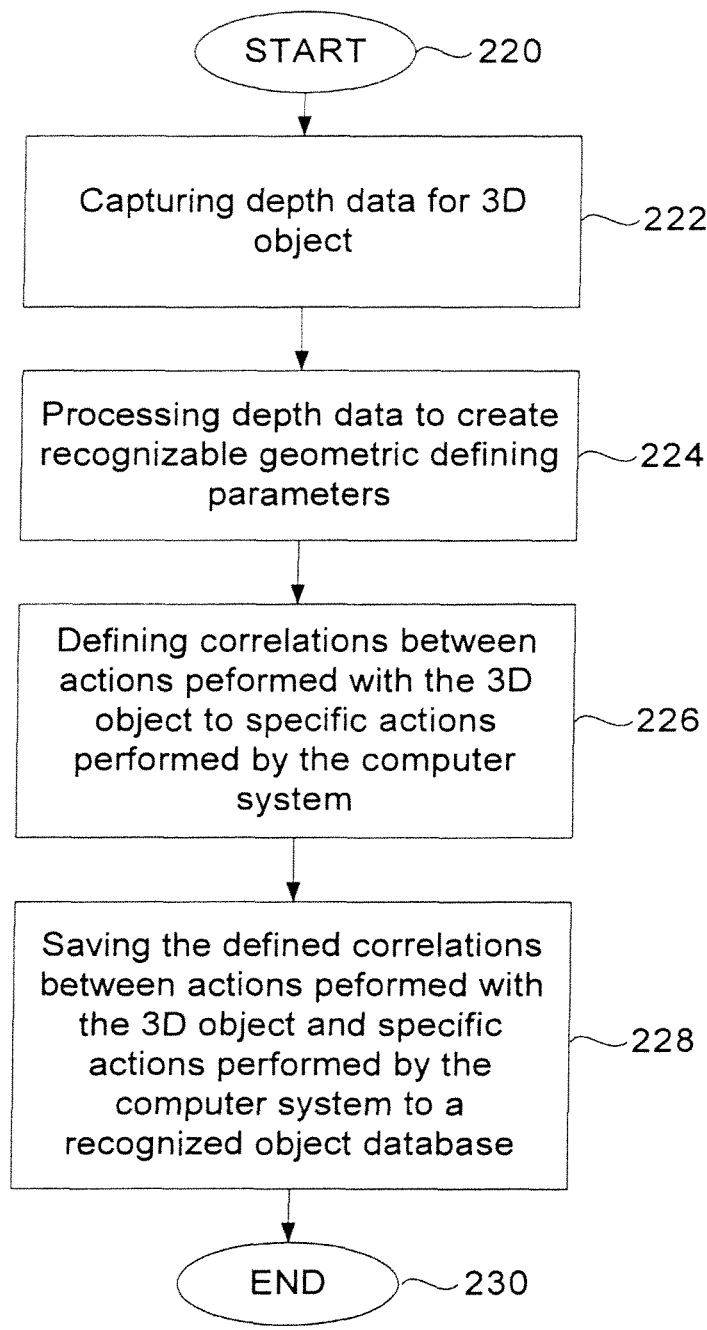
FIG. 2B is another exemplary flow chart illustrating a procedure to define and use a three-dimensional object to control a computer system, in accordance with one embodiment of the present invention.

FIG. 2B is another exemplary flow chart illustrating a procedure to define and use a three-dimensional object to control a computer system, in accordance with one embodiment of the present invention. The procedure beings with start operation 220. In operation 222, a user presents a three-dimensional object and depth data for the three-dimensional object is captured. As previously discussed, a single depth camera or multiple depth cameras can be used to capture depth data for the three-dimensional object. Operation 224 processing the captured depth data for the three-dimensional object to create geometric defining parameters. In one embodiment, the depth data can be used to create wire frame models of the three-dimensional object. In another embodiment, the depth data for the three-dimensional object can be processed to define particular features such as, but not limited to, length, height, and width.

Operation 226 is where a user can define correlation between actions performed with the three-dimensional object and specific actions that are to be performed by the computer. The actions performed with the three-dimensional object can include moving and manipulating the three-dimensional object in a manner than can be detected by the depth camera or other sensors associated with the computer system. The computer system can capture a sequence of images and depth data of a user performing actions with the three-dimensional object and determine a relative position of the three-dimensional object throughout the action. For example, in one embodiment, a user can wave the three-dimensional object in a single plane or wave the three-dimensional object across multiple planes. Similarly, in another embodiment a user can create complex or simple gestures in a real-world three-dimensional space while holding the three-dimensional object.

The user can associate or correlate particular real-world actions or gestures performed with the three-dimensional object to virtual world actions performed by the computer. Thus, when a user performs a particular gesture while holding the three-dimensional object, the computer system can perform a particular task or execute a particular instruction. In some embodiments, real-world actions performed with the three-dimensional object can be associated with particular virtual world motions such as swinging a virtual world golf club or tennis racquet. In other embodiments, real-world actions can be associated with user interface menu navigation.

Operation 228 saves the geometric defining parameters for the three-dimensional object along with the correlations between user actions with the three-dimensional object and virtual world actions performed by the computer to a database. Once saved in the database, the computer system can perform real-time analysis on depth data to recognize geometric defining parameters within the database if a user picks up the corresponding real-world three-dimensional object. Furthermore, the computer system can perform real-time analysis on user actions while holding the recognized three-dimensional object to recognize when a user performs an action correlating to a virtual world action or command for the computer system. The procedure is terminated with end operation 230.

FIGS. 3A-3G illustrate real-world and virtual-world views of various actions performed by users while holding the three-dimensional object 102, in accordance with various embodiments of the present invention. In the following examples, the three-dimensional object 102 has been configured to perform a particular function associated with various in-game actions. The following examples are exemplary and not intended to be limiting. Furthermore, it should be noted that a three-dimensional object could be recognized and configured to perform multiple functions for more for multiple different games.

FIG. 3A illustrates a how a three dimensional object 102 can be configured to be used like a baseball bat, in accordance with one embodiment of the present invention. In the real-world view, the user 101a is shown holding the three-dimensional object 102 and swinging it like a baseball bat. Accordingly, as shown in the in-game view of FIG. 3A, an in game character 101b, representative of the user 101a, swings a virtual baseball bat 300 in response to the real-world swing of the three-dimensional object 102. In one embodiment, the in game character 101b is a computer-generated likeness of a real-world professional baseball player swinging a virtual baseball bat 300 in response to the user 101a swinging the three-dimensional object 102. In another embodiment, the in game character 101b is a user created avatar integrated into a virtual baseball stadium. In other embodiments, the in game character 101b can be a combination of computer generated real-world characters and user generated avatars swinging a virtual baseball bat 300 in response to the real-world swing of the three-dimensional object 102.

FIG. 3B illustrates how different orientations of the three-dimensional object 102 can be configured to different actions of a virtual world light sword 302a and 302b, in accordance with one embodiment of the present invention. As illustrated in the real-world view, the user 101 is holding a three-dimensional object 102a in a first orientation. In one embodiment, this first orientation 102a is correlated to the virtual world light sword 302a being turned "off", as shown in the in-game view of FIG. 3B. Conversely, when the user 101 holds the three-dimensional object 102b in a second orientation as shown in the real-world view, the virtual world light sword 302b is shown in an "on" position, in the in-game view. Thus, when the user 101 is holding the three-dimensional as shown in orientation 102b, the computer will display the in-game character with the light sword extended. Additionally, while held as three-dimensional object 102b, in an "on" position, the camera and computer system can recognize movement of the three-dimensional object 102b, and move the in-game light sword 302b accordingly.

Figure 3G:
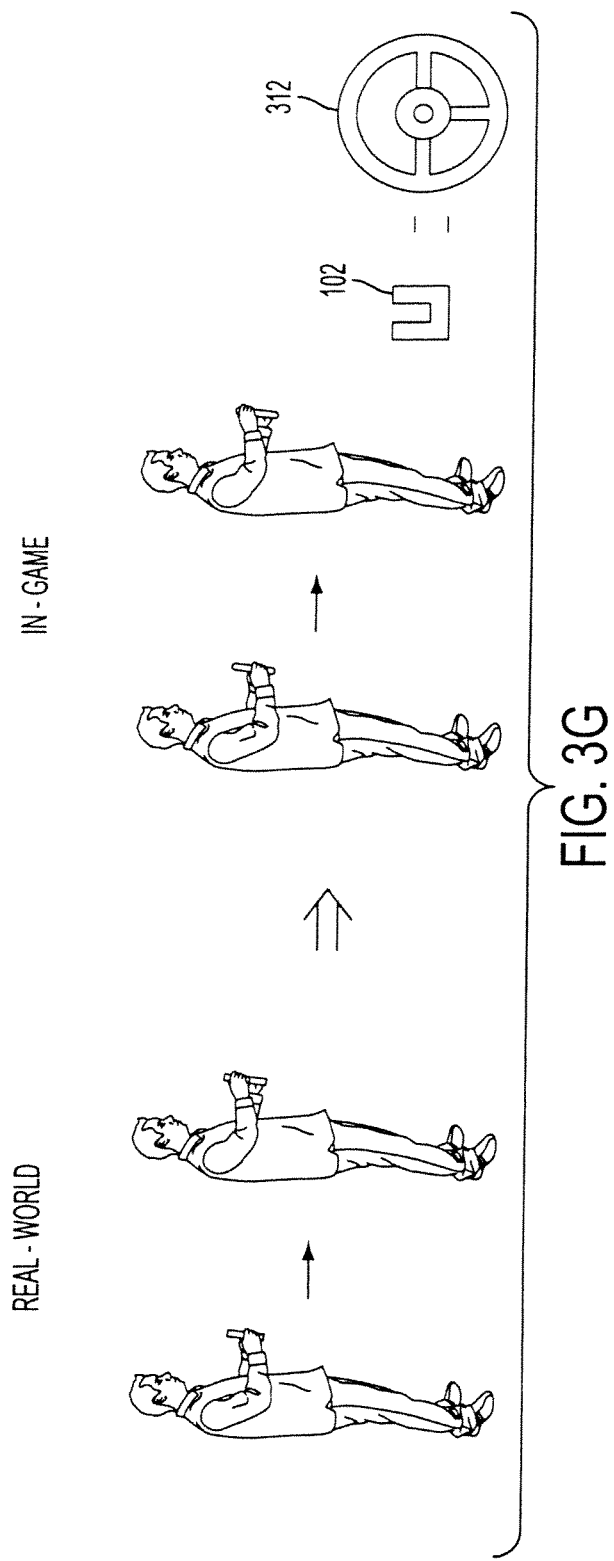

FIGS. 3C-3G illustrate other virtual-world objects that can be controlled using the three-dimensional object 102, in accordance with other embodiments of the present invention. For example, in FIG. 3C, the three-dimensional object 102 can be used to control the swing of a virtual golf club 304. Similarly, in FIG. 3D, a virtual tennis racquet 306 can be controlled by a user swinging the three-dimensional object 102. In FIG. 3E, the three-dimensional object 102 can be used to allow a user to control a virtual bowling ball 308. In FIG. 3F, the three-dimensional object 102 can be used in a virtual game of pool or billiards to control a virtual cue 310. Another example of where the orientation of the three-dimensional object may need to be detected is found in FIG. 3G where the three-dimensional object 102 is used to control a virtual steering wheel 312. Orientation of the three-dimensional object 102 can be used to determine when the virtual steering wheel 312 returns to a centered position resulting in the virtual car traveling in a substantially straight direction. Accordingly, orientation of a three-dimensional object 102 when held by a user can also be applied to control of other virtual world objects or even control of the computer system interface.

FIGS. 4A-4D are examples where various three-dimensional objects can be recognized and used to control a variety of virtual world devices based on the configuration of the three-dimensional object and the software being executed by the computer system, in accordance with one embodiment of the present invention. FIG. 4A shows a scene 400 with three-dimensional objects 102, 402, and 404 in front of a user 101. In this example, three-dimensional objects 102, 402, and 404 have previously been captured by the computer system and can be recognized by the computer system when presented to the camera 104.

In FIG. 4B, the user 100 picks up a three-dimensional object 102 and software being executed on the computer system determines if the three-dimensional object controls a baseball bat 406, a steering wheel 408, or a remote control 410. In one embodiment, if the computer system is executing a baseball simulation program, the three-dimensional object 102 is recognized and rendered as a virtual world baseball bat 406. Thus, the computer system can attempt to recognize batting swing motions performed by the user 100 with the three-dimensional object 102. Similarly, if the computer system is executing software to simulate a tennis simulation, the user 100 can control a virtual world tennis racquet 408 based on the real-world movement of the three-dimensional object 102. In another embodiment, movements and interactions with the three-dimensional object 102 can be configured and recognized functions from a remote control 410. This can allow a user to perform motions with the three-dimensional object 102 that result in, but not limited to, increasing/decreasing volume, accessing a channel guide, and paging up/down within the channel guide.

In FIG. 4C, the user has picked up three-dimensional object 402. The three-dimensional object 402 can be used as a remote control 410. Alternatively, the three-dimensional object 402 can be used to control a virtual tennis racquet 412, or a virtual bowling ball 414. Similarly, in FIG. 4D, depending on the type of software being executed on the computer system, three-dimensional object 404 can be recognized as a virtual baseball bat 406, a virtual golf club 416 or a remote control 410. In some embodiments, where software executed on the computer system can recognize multiple virtual world counterparts associated with a three-dimensional object, the computer system can prompt the user to select which virtual world counterpart to control. In another embodiments, when a user picks up a three-dimensional object the computer system automatically recognizes the three-dimensional object as a user defined default virtual object. Thus, while executing the appropriate software, a user can configure the three-dimensional objects 102, 402 and 404 to be associated respectively with the virtual baseball bat, the virtual bowling ball, and the virtual golf club. Thus, when object 102 is picked up, the on screen character is immediately shown holding a baseball bat. Likewise, when the user picks up three-dimensional object 402, the on screen character is holding and has control of a virtual bowling ball. Similarly, the virtual golf club 416 is controlled by an on screen character when the user picks up three-dimensional object 404. In another embodiment, the various three-dimensional objects 102, 402, 404 could be representative of different weapons that can be accessed by a character in a first-person shooter game. For example, object 102 can correspond to a knife, object 402 can correspond to a pistol, and object 404 can correspond to an assault rifle. Physically switching between real world three-dimensional objects can result in increase user interaction and enjoyment of the first person shooter game.

Figure 5A:
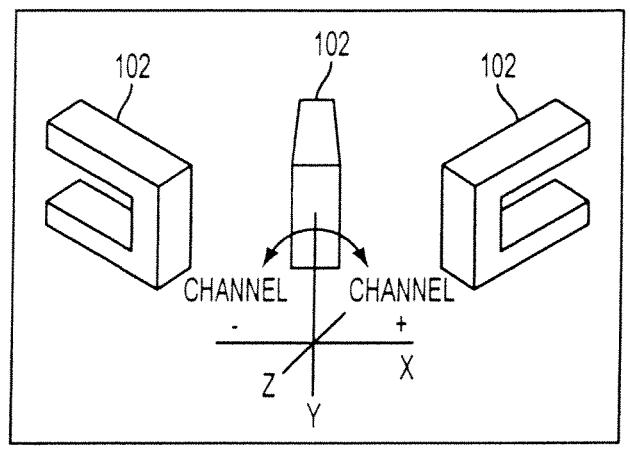
FIG. 5A and FIG. 5B illustrate movements of a three-dimensional object to perform pre-configured remote control operations, in accordance with one embodiment of the present invention.
Figure 5B:
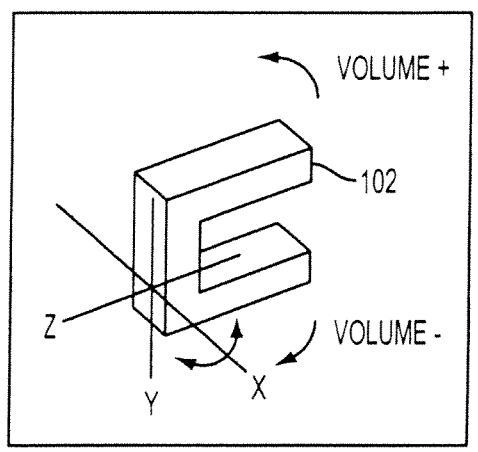

FIG. 5A and FIG. 5B illustrate movements or deformations of a three-dimensional object 102 to perform pre-configured remote control operations, in accordance with one embodiment of the present invention. After capturing and mapping both un-deformed and deformed geometric defining parameters of the three-dimensional object 102 to basic television functions, the computer system can recognize changes made to the three-dimensional object 102 to control television functions such as changing the channel or changing the volume. In the embodiment shown in FIG. 5A, rotating the three-dimensional object 102 around the Y-axis, can result in changing the channel up or down. Likewise, in the embodiment shown in FIG. 5B, rotating the three-dimensional object about the X-axis can change the volume up or down.

Figure 6A:
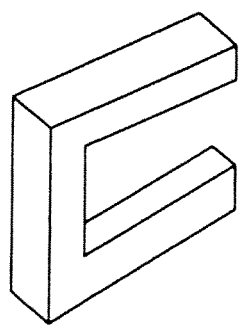
FIGS. 6A-6D illustrate capturing a three-dimensional object in various states of deformation, in accordance with one embodiment of the present invention.
Figure 6B:
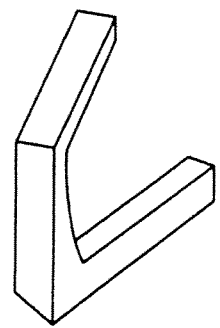
Figure 6C:
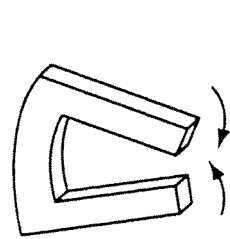
Figure 6D:
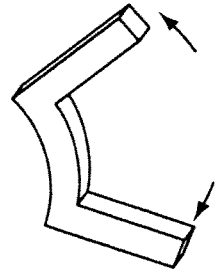

FIGS. 6A-6D illustrate capturing a three-dimensional object in various states of deformation, in accordance with one embodiment of the present invention. For example, the three-dimensional object can be twisted and bent to control various aspects of the software being executed on the computer system. In one embodiment, twisting the three-dimensional object from the original shape shown in FIG. 6A to the deformed shape in FIG. 6B can bring up a television schedule. Similarly, deforming the three-dimensional object as shown in FIG. 6C can be correlated to having the computer system display the next page of the television schedule. Conversely, deforming the three-dimensional object as shown in FIG. 6D can instruct the computer system to display the previous page of the television schedule.

The deformation and corresponding actions used in FIGS. 6A-6D are intended to be exemplary and should not be considered limiting. In other embodiments, three-dimensional mechanical objects can be captured in various states to control various aspects of virtual world machines, virtual world objects, or graphical user interfaces. For example, scissors or a stapler can be captured in both the open and closed position. In one embodiment, a virtual world character can be standing when the stapler or scissors are closed, and crouched when the stapler or scissors are open. Alternatively, opening and closing the stapler or scissors can make an in-game character jump.

Figure 7:
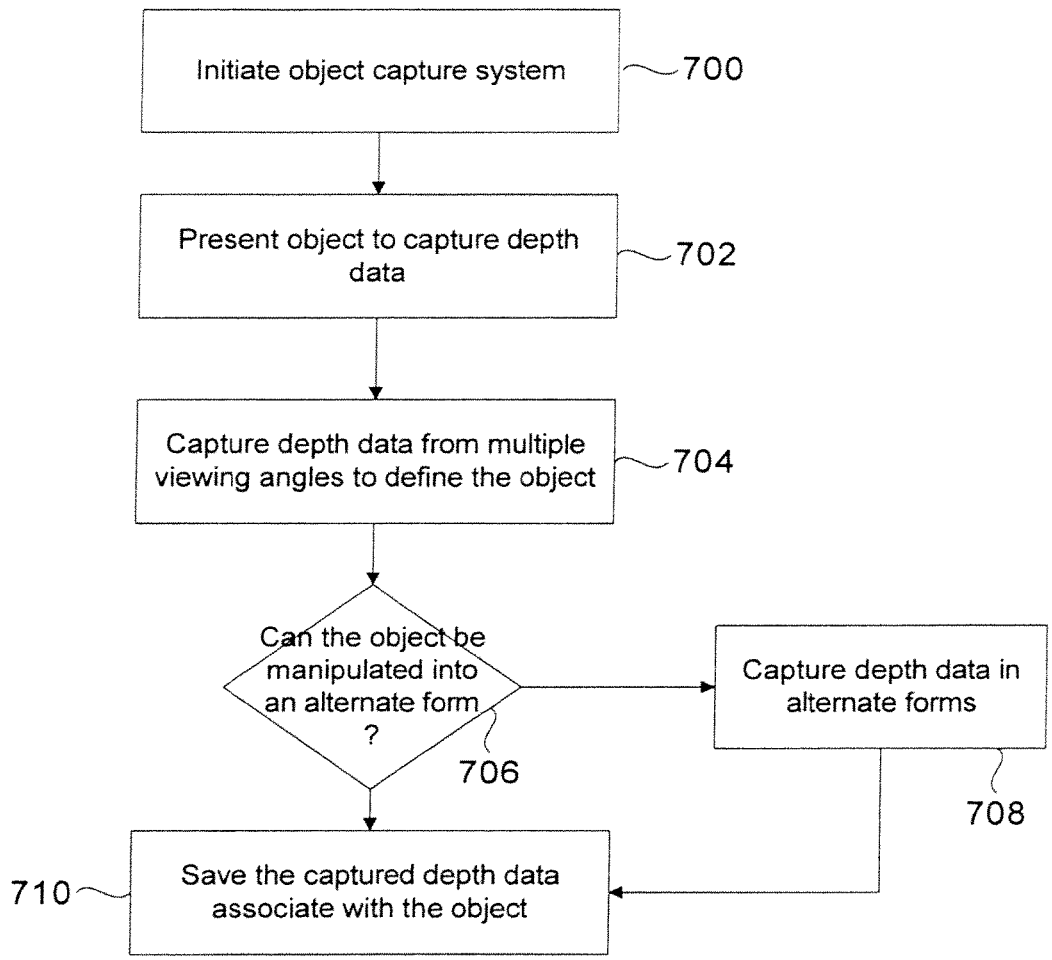
FIG. 7 is an exemplary flow chart illustrating operations to map geometric defining parameters of a three-dimensional object, in accordance with one embodiment of the present invention.

FIG. 7 is an exemplary flow chart illustrating operations to map geometric defining parameters of a three-dimensional object for use to control a computer system, in accordance with one embodiment of the present invention. In operation 700 a user initiates the object capture system. In operation 702, the user presents the object to the depth camera. The object can be any object discernable by the depth camera and the object does not need to be specifically configured to interface with the computer system. In operation 704, the depth camera and computer system capture depth data from multiple viewing angles to define the object through geometric defining parameters. In some embodiments the geometric defining parameters can be associated with dimensions such as height, depth, and width. In other embodiments, ratios between particular features of the object can be used. In still other embodiments, a combination of dimensions and feature ratios can be used as geometric defining parameters.

In operation 706, it is determined whether the object can be deformed or manipulated into a different or alternate form. In one embodiment, this operation can be as performed by prompting the user to indicate whether the object is deformable or capable of having an alternate configuration. In yet another embodiment, the computer system can include basic generic object shapes that can be recognized as deformable. For example, the computer system may be able to recognize a generic pair of scissors or a stapler. As such, when a user presents scissors or a stapler, the computer system can automatically prompt the user to capture depth data for the deformed or alternate configuration. Operation 708 captures depth data for the manipulated or deformed object. In some embodiments, Operation 708 may require the user to present the object in the alternate form to the depth camera from multiple viewing angles, similar to the viewing angles in operation 704. Operation 710 saves all of the depth data associated with the object, including any alternate or manipulated form of the object.

Figure 8:
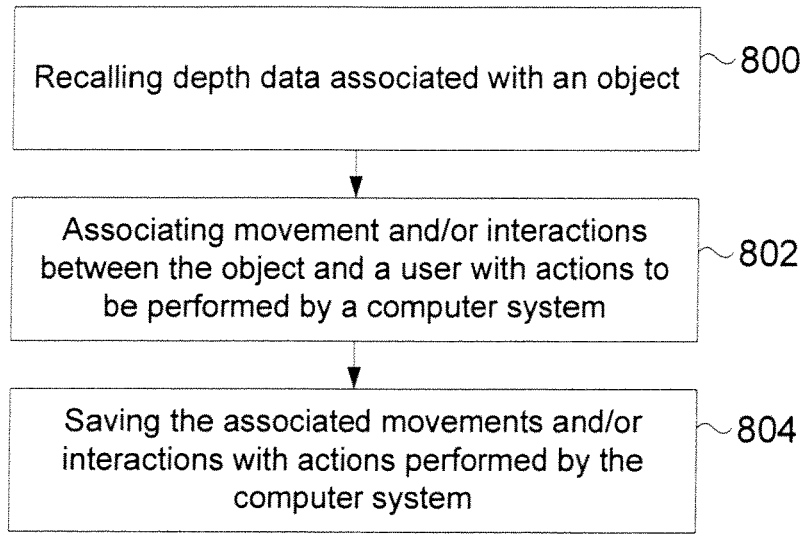
FIG. 8 is an exemplary flow chart illustrating one method to configure an object to control virtual elements or the graphical user interface of the computer system, in accordance with one embodiment of the present invention.

FIG. 8 is an exemplary flow chart illustrating one method to configure an object to control virtual elements or the graphical user interface of the computer system, in accordance with one embodiment of the present invention. Operation 800 recalls saved depth data associated with an object. In some embodiments the recalled depth data is stored on local storage associated with the computer system such as a local hard drive or flash memory. In other embodiments, the depth data can be stored on a local network or in still further embodiments, on remote storage accessible via the internet.

Operation 802 associates movement of the object with actions performed by the computer system. In other embodiments, operation 802 can associate actions performed with the object such as waving, shaking, or deforming the object with actions performed by the computer system. Operation 804 saves the associated movements and actions with the depth data associated with the object. The associated movements and actions can be saved to a local storage element such as a hard drive or other non-volatile memory. Alternatively, the associated movements and actions can be uploaded to network storage via the internet and publicly shared among friends.

Figure 9:
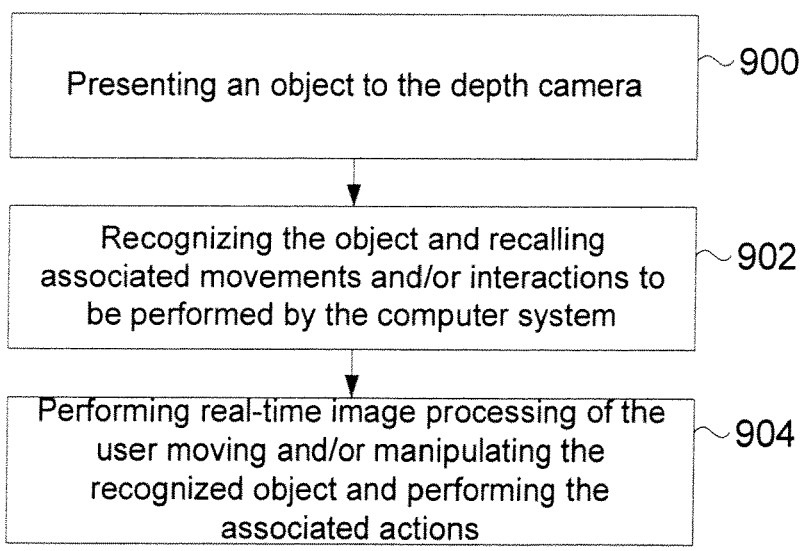
FIG. 9 is an exemplary flow chart illustrating operations to utilize an object that has been mapped and configured, in accordance with one embodiment of the present invention.

FIG. 9 is an exemplary flow chart illustrating operations to utilize an object that has been mapped and configured, in accordance with one embodiment of the present invention. In operation 900 a user presents an object to the depth camera for recognition. In operation 902, the computer system performs real-time analysis of the depth camera data and recognizes the object from stored geometric parameters. Operation 902 also loads any associated movements and actions that are stored with the depth data associated with the object. In operation 904, the camera and computer system perform real-time image processing of the user manipulating and moving the object and perform the desired actions when actions with the object are recognized. It is possible for a user to have multiple objects mapped and configured and the computer system is capable of recognizing and switching between configurations as different objects are presented to the depth camera. Furthermore, a single object can have multiple configurations and upon recognition, a default configuration is loaded. In one embodiment, the user can selectively load an alternate configuration. In other embodiments, the user is asked to confirm loading the default configuration when multiple configurations for one object are present.

Figure 10:
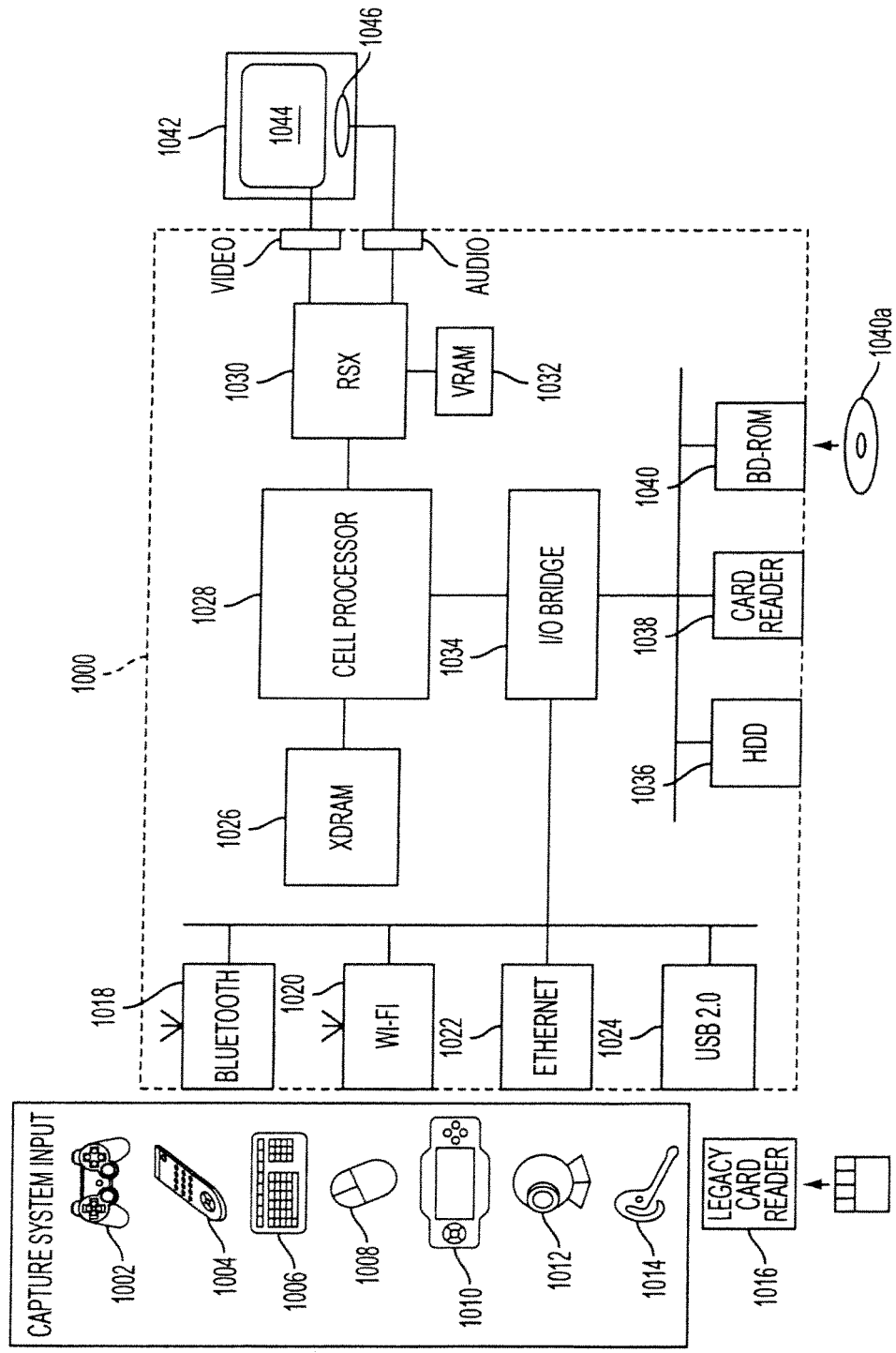
FIG. 10 schematically illustrates the overall system architecture of the Sony® Playstation 3® entertainment device, a computer system capable of utilizing dynamic three-dimensional object mapping to create user-defined controllers in accordance with one embodiment of the present invention.

FIG. 10 schematically illustrates the overall system architecture of the Sony® Playstation 3® entertainment device, a computer system capable of utilizing dynamic three-dimensional object mapping to create user-defined controllers in accordance with one embodiment of the present invention. A system unit 1000 is provided, with various peripheral devices connectable to the system unit 1000. The system unit 1000 comprises: a Cell processor 1028; a Rambus® dynamic random access memory (XDRAM) unit 1026; a Reality Synthesizer graphics unit 1030 with a dedicated video random access memory (VRAM) unit 1032; and an I/O bridge 1034. The system unit 1000 also comprises a Blu Ray® Disk BD-ROM® optical disk reader 1040 for reading from a disk 1040a and a removable slot-in hard disk drive (HDD) 1036, accessible through the I/O bridge 1034. Optionally the system unit 1000 also comprises a memory card reader 1038 for reading compact flash memory cards, Memory Stick® memory cards and the like, which is similarly accessible through the I/O bridge 1034.

The I/O bridge 1034 also connects to six Universal Serial Bus (USB) 2.0 ports 1024; a gigabit Ethernet port 1022; an IEEE 802.11b/g wireless network (Wi-Fi) port 1020; and a Bluetooth® wireless link port 1018 capable of supporting of up to seven Bluetooth connections.

In operation the I/O bridge 1034 handles all wireless, USB and Ethernet data, including data from one or more game controllers 1002. For example when a user is playing a game, the I/O bridge 1034 receives data from the game controller 1002 via a Bluetooth link and directs it to the Cell processor 1028, which updates the current state of the game accordingly.

The wireless, USB and Ethernet ports also provide connectivity for other peripheral devices in addition to game controllers 1002, such as: a remote control 1004; a keyboard 1006; a mouse 1008; a portable entertainment device 1010 such as a Sony Playstation Portable® entertainment device; a video camera such as an EyeToy® video camera 1012; and a microphone headset 1014. Such peripheral devices may therefore in principle be connected to the system unit 1000 wirelessly; for example the portable entertainment device 1010 may communicate via a Wi-Fi ad-hoc connection, whilst the microphone headset 1014 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1016 may be connected to the system unit via a USB port 1024, enabling the reading of memory cards 1048 of the kind used by the Playstation® or Playstation 2® devices.

In the present embodiment, the game controller 1002 is operable to communicate wirelessly with the system unit 1000 via the Bluetooth link. However, the game controller 1002 can instead be connected to a USB port, thereby also providing power by which to charge the battery of the game controller 1002. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1004 is also operable to communicate wirelessly with the system unit 1000 via a Bluetooth link. The remote control 1004 comprises controls suitable for the operation of the Blu Ray Disk BD-ROM reader 1040 and for the navigation of disk content.

The Blu Ray Disk BD-ROM reader 1040 is operable to read CD-ROMs compatible with the Playstation and PlayStation 2 devices, in addition to conventional pre-recorded and recordable CDs, and so-called Super Audio CDs. The reader 1040 is also operable to read DVD-ROMs compatible with the Playstation 2 and PlayStation 3 devices, in addition to conventional pre-recorded and recordable DVDs. The reader 1040 is further operable to read BD-ROMs compatible with the Playstation 3 device, as well as conventional pre-recorded and recordable Blu-Ray Disks.

The system unit 1000 is operable to supply audio and video, either generated or decoded by the Playstation 3 device via the Reality Synthesizer graphics unit 1030, through audio and video connectors to a display and sound output device 1042 such as a monitor or television set having a display 1044 and one or more loudspeakers 1046. The audio connectors 1050 may include conventional analogue and digital outputs whilst the video connectors 1052 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1028. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1012 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1000. The camera LED indicator is arranged to illuminate in response to appropriate control data from the system unit 1000, for example to signify adverse lighting conditions. Embodiments of the video camera 1012 may variously connect to the system unit 1000 via a USB, Bluetooth or Wi-Fi communication port. Embodiments of the video camera may include one or more associated microphones that are also capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1000, an appropriate piece of software such as a device driver should be provided. Device driver technology is well-known and will not be described in detail here, except to say that the skilled man will be aware that a device driver or similar software interface may be required in the present embodiment described.

Embodiments may include capturing depth data to better identify the real-world user and to direct activity of an avatar or scene. The object can be something the person is holding or can also be the person's hand. In this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above-described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data that can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system, comprising:
   a camera configured to capture data of a three-dimensional space, the three-dimensional space including an object to be used as a controller; and
   a computer system being interfaced with the camera and a display screen;
   the computer system providing a graphical display that is rendered on the display screen, the graphical display receiving user input in response movements of the object in the three-dimensional space, wherein the object is configured to be tracked using at least image data captured by the camera, wherein the object is rendered in the graphical display as a virtual object for interfacing with interactive content of the graphical display,
   wherein the interfacing includes enabling the virtual object to cause one or more actions to be executed by the computer system when the object is moved during an interactive session of interfacing with the interactive content that is executed by the computer system;
   wherein the object has a shape that is captured in said image data by the camera.

2. The system as recited in claim 1, wherein the computer system executes one of a program, a game program, an application, a search engine, a communication program, or a combination of two or more thereof.

3. The system as recited in claim 1, wherein said shape is trackable for changes in position when used to provide input to the computer system.

4. The system as recited in claim 1, wherein the camera is configured to capture one or more red-green-blue (RGB) image frames of said image data, and additionally capture one or more of depth data, infrared lighting, or distance data.

5. The system as recited in claim 1, wherein depth data is captured by said camera or another capture device to enable the computer system to construct at least a partial wire frame model of the object for identifying said shape.

6. The system as recited in claim 1, wherein the computer system causes the camera to capture a sequence of images to enable identification of the shape or changes in position of the shape of the object.

7. The system as recited in claim 2, wherein the computer program is configured to execute images to produce a virtual reality space having said interactive content, wherein the object is a real-world object and the real-world object is represented in the virtual reality space as said virtual object, such that movement of the object are shown as movements of the virtual object in the virtual reality space.

8. A computer implemented method, comprising:
   capturing image data of an object using a camera;
   processing the image data of the object to identify geometric parameters of object;
   during an interactive session processed by a computer system, using the captured image data and the identified geometric parameters of the object to track movements of the object; and
   rendering on a display, a virtual object, that is used to represent the object, the virtual object being rendered on the display such that movement of the object causes rendering of corresponding movement by the virtual object on a display screen.

9. The computer implemented method of claim 8, wherein the virtual object is rendered in a virtual reality scene rendered on the display.

10. The computer implemented method of claim 8, wherein the camera is one that is configured to capture red-green-blue (RGB) images, or infrared images, or depth images, or a combination to two or more thereof.

11. The computer implemented method of claim 8, wherein the movements of the object are mapped to specific inputs to be made by the virtual object in a virtual reality scene.

12. The computer implemented method of claim 8, further comprising,
   triggering activation of actions by the virtual object during the interactive session in response to select movements, or changes in position of the object, as captured by the camera.

13. The computer implemented method of claim 8, wherein actions by virtual objects are pre-correlated to one or more of said select movements or changes in positions or gestures performed with the object, wherein said pre-correlation is for a specific application executed during the interactive session.

14. The computer implemented method of claim 8, wherein movements include one or more of moving the object, turning the object, waving the object, tapping the object, shaking the object, pointing with the object, gesturing with the object, or combination of two or more thereof during the interactive session.

15. The computer implemented method of claim 8, wherein the object is a physical object that is hand-held by a user.

16. The computer implemented method of claim 8, wherein the interactive session is of a video game or an application that renders a virtual reality scene for rendering the virtual object, the virtual reality scene having one or more objects and the virtual object used to interact or interface with the one or more objects.

17. Computer readable media having program instructions for executing an application for interfacing with a virtual reality scene, the computer readable media, comprising:
   program instructions for capturing image data of an object using a camera;
   program instructions for processing the image data of the object to identify geometric parameters of object;
   program instructions for, during an interactive session processed by a computer system, using the captured image data and the identified geometric parameters of the object to track movements of the object; and
   program instructions for rendering on a display, the virtual object, that is used to represent the object, the virtual object being rendered on the display such that movement of the object causes rendering of corresponding movement by the virtual object on the display screen.

18. The computer readable media of claim 17, wherein the virtual object is rendered in the virtual reality scene rendered on the display.

19. The computer readable media of claim 17, wherein the camera is one that is configured to capture red-green-blue (RGB) images, or infrared images, or depth images, or a combination to two or more thereof.

20. The computer readable media of claim 17,
   wherein the movements of the object are mapped to specific inputs to be made by the virtual object in the virtual reality scene;
   wherein movements include one or more of moving the object, turning the object, waving the object, tapping the object, shaking the object, pointing with the object, gesturing with the object, or combination of two or more thereof during the interactive session;

wherein the interactive session is of a video game or the application that renders the virtual reality scene for rendering the virtual object, the virtual reality scene having one or more objects and the virtual object used to interact or interface with the one or more objects.

* * * * *